United States Patent
Ivanov et al.

(10) Patent No.: US 8,723,699 B2
(45) Date of Patent: May 13, 2014

(54) METHOD AND APPARATUS FOR CONTROLLING A DEVICE

(75) Inventors: Plamen A. Ivanov, Schaumburg, IL (US); Daniel L. Richards, Mundelein, IL (US); Mark F. Valentine, Kenosha, WI (US); Sandeep P. Vuppu, Wheeling, IL (US)

(73) Assignee: Motorola Mobility LLC, Chicago, IL (US)

( * ) Notice: Subject to any disclaimer, the term of this patent is extended or adjusted under 35 U.S.C. 154(b) by 783 days.

(21) Appl. No.: 12/942,052

(22) Filed: Nov. 9, 2010

(65) Prior Publication Data

US 2012/0112930 A1    May 10, 2012

(51) Int. Cl.
*H03M 11/00* (2006.01)
*G06F 1/16* (2006.01)

(52) U.S. Cl.
CPC .................................. *G06F 1/16* (2013.01)
USPC ........... 341/20; 455/556.1; 345/158; 345/168

(58) Field of Classification Search
CPC .............................................. G06F 2200/1636
USPC .................. 341/20; 455/556.1; 345/158, 173
See application file for complete search history.

(56) References Cited

U.S. PATENT DOCUMENTS

| | | | | |
|---|---|---|---|---|
| 6,933,923 | B2* | 8/2005 | Feinstein | 345/158 |
| 7,351,065 | B1* | 4/2008 | Merrell et al. | 439/31 |
| 7,583,255 | B2 | 9/2009 | Ing | |
| 7,810,750 | B2* | 10/2010 | Abreu | 242/378.1 |
| 7,881,295 | B2* | 2/2011 | Fry | 370/392 |
| 8,482,403 | B2* | 7/2013 | Thorn | 340/539.11 |
| 2002/0190947 | A1* | 12/2002 | Feinstein | 345/158 |
| 2003/0066692 | A1* | 4/2003 | Devige et al. | 178/18.04 |
| 2009/0146962 | A1* | 6/2009 | Ahonen et al. | 345/173 |
| 2010/0027843 | A1* | 2/2010 | Wilson | 382/103 |
| 2010/0048241 | A1* | 2/2010 | Seguin et al. | 455/556.1 |

* cited by examiner

*Primary Examiner* — Albert Wong

(57) ABSTRACT

A method and apparatus for controlling a device is provided herein. During operation, a user's headset is tapped upon in order to control a device. More particularly, a user's headset (or the device itself) uses circuitry that allows the headset or the device to detect user taps (for example on either earpiece of the connected 3.5 mm jack stereo headset, or the housing of the headset). The taps serve as user inputs to control the device. Because a user can control a device simply by tapping upon a headset, the device can be accessed without necessitating the need to wake the device to access control functions (e.g., music control functions).

10 Claims, 4 Drawing Sheets

METHOD AND APPARATUS FOR CONTROLLING A DEVICE

FIELD OF THE INVENTION

The present invention relates generally to a method and apparatus for controlling a device, and in particular, to a method and apparatus for controlling a device based on a tap received to a headset.

BACKGROUND OF THE INVENTION

Portable communication devices support voice calling and music playback over headphones. Access to the user interface (UI) or control functions of the device requires tactile targeting of specialized hardware or software keys located on the device itself or on an attached headset. Furthermore, a user's favored pair of plug-in 3.5 mm stereo headphones will probably not have customized controls, necessitating the need to wake the device to access music control functions, or to use specialized headphones instead. Therefore, there is a need for a method and apparatus for controlling a device that provides a convenient user interface, and does not require access to the device itself or any specialized hardware or software keys.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE DRAWINGS

In order to alleviate the above-mentioned need, a method and apparatus for controlling a device is provided herein. During operation, a user's headset is tapped upon in order to control a device. More particularly, a user's headset (or the device itself) uses circuitry that allows the headset or the device to detect user taps (for example on either earpiece of the connected 3.5 mm jack stereo headset, or the housing of the headset). The taps serve as user inputs to control the device. Because a user can control a device simply by tapping upon a headset, the device can be accessed without necessitating the need to wake the device to access control functions (e.g., music control functions).

The present invention encompasses a method for controlling a device. The method comprises the steps of determining by a tap detector, that a user has tapped upon a headset and controlling by circuitry, functionality based on the reception of the tap upon the headset.

The present invention additionally encompasses an apparatus comprising a tap detector determining that a user has tapped upon a headset, and logic circuitry controlling functionality of a device based on the reception of the tap upon the headset.

Figure 1:
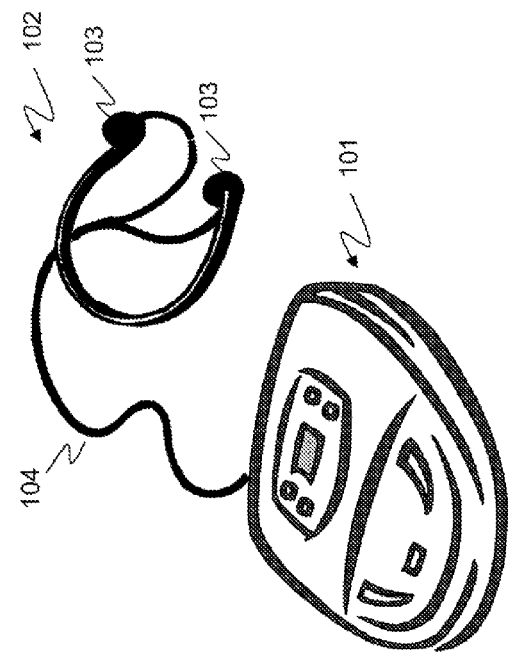
FIG. 1. illustrates a headset attached to a communication device.

Turning now to the drawings, where like numerals designate like components, FIG. 1 is a block diagram showing device 101 and headset 102. Device 101 preferably comprises a device that utilizes some input from a user in order to control functionality of device 101. For example, device 101 may comprise a music player that allows a user to select a particular song, adjust a volume level, skip songs, . . . , etc. Device 101 may also comprise a cellular telephone, or smart phone capable of receiving user input in order to control the functionality of device 101.

As shown, headset 102 is coupled to device 101 via cable 104, however, one of ordinary skill in the art will recognize that headset 102 and device 101 can be coupled to each other wirelessly, for example, via a wireless stereo Bluetooth connection. Headset 102 is preferably a standard 3.5 mm jack stereo headset with speakers 103 that serve as standard ear buds.

As described above, prior-art techniques to access to a user interface (UI) or control functions of device 101 requires tactile targeting of specialized hardware or software keys located on the device itself or hardware/software keys located on an attached headset. Furthermore, a user's favored pair of plug-in 3.5 mm stereo headphones may not have customized controls, necessitating the need to wake the device to access music control functions, or to use specialized headphones instead. Therefore, there is a need for a method and apparatus for controlling a device that provides a convenient user interface, and does not require access to the device itself or any specialized hardware or software keys.

In order to address this need, device 101 is controlled by simply tapping headset 102, without the need to press any button. For example, a simple double tap on the headset may increase a volume level in device 101, while a triple tap on the headset may decrease the volume level.

Figure 2:
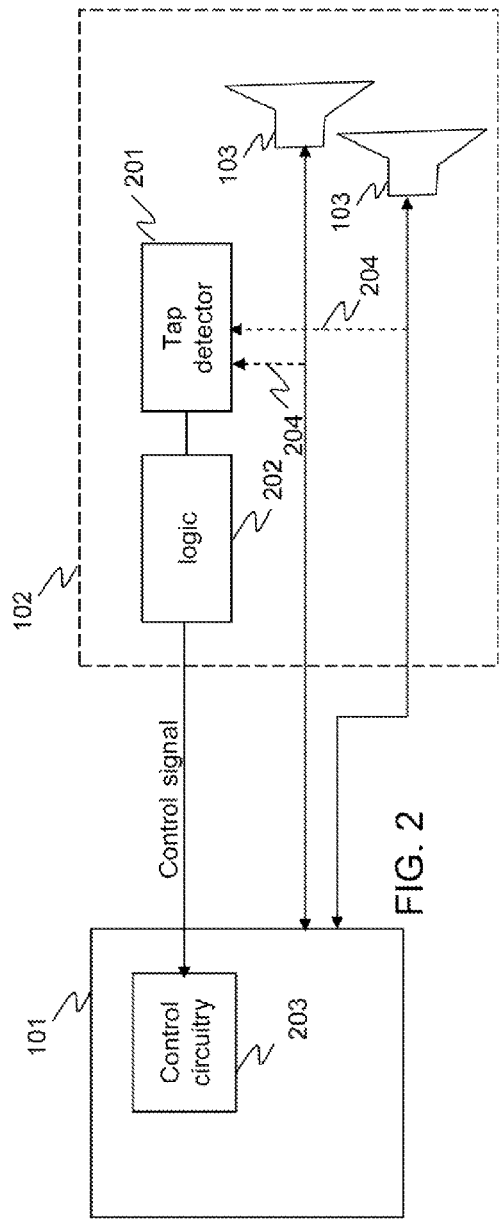
FIG. 2. is a block diagram of the headset and device of FIG. 1.

FIG. 2. is a block diagram of the headset and device of FIG. 1. In this particular embodiment, headset 102 is equipped with circuitry that detects a user's tap, and then feeds back an appropriate control signal. As shown, headset 102 comprises speaker 103, tap detector 201, and logic circuitry 202. Speaker 103 comprises a standard headset speaker. Logic circuitry 202 comprises a digital signal processor (DSP), general purpose microprocessor, a programmable logic device, or application specific integrated circuit (ASIC) and is utilized to receive input from tap detector 201, decipher the tap (e.g., how many taps received in a given time period), and provide the appropriate control signal to device 101 (e.g., two taps received within one second would result in a "volume up" command being sent to device 101).

In a first embodiment, tap detector 201 preferably comprises a standard micro machined accelerometer used to measure a proper acceleration it experiences relative to freefall. Preferably, accelerometer 201 comprises a multi-axis accelerometer that is capable of detecting magnitude and direction of a user tap as a vector quantity, and provides this information to logic circuitry 202.

It should be noted that for this particular embodiment, tap detector 201 comprises an accelerometer, giving tap detector 201 the ability to determine that headset 102 has been tapped. However, tap detector 201 may take other forms such as a simple pressure sensor or a resistive or capacitive touch sensor (or multiple such sensors). Still other forms of tap detectors may be provided which will give detector 201 an ability to determine where on headset 102 the tap occurred. For example detector 201 may simply be coupled to at least one speaker in headset 102 via connection 204. Because most transducers (i.e., speakers 103), including audio transducers, are capable of bi-directional energy transfer, tap detector 201 may be designed to receive this input from each speaker. This will allow tap detector 201 to determine what speaker 103 was tapped.

During the operation of headset 102, tap detector 201 is continuously monitoring for taps on headset 102. This information is provided to logic circuitry 202. Logic circuitry 202 determines if a user tap was received, and if so, provides the appropriate signal to control circuitry 203 of device 101. The following table illustrates some functionality that may be controlled by headset 102.

TABLE 1

Control function based on taps received

| TAP | CONTROL |
|---|---|
| one tap on right headphone | mute/unmute volume |
| two taps within a second on right headphone | increase volume |
| three taps within a second on right headphone | decrease volume |
| One tap on left headphone | answer phone call |
| Two taps within a seconf on left headphone | hang up |
| Three taps within a second on left headphone | call back |
| One tap on right, then on the left headphone | Skip to previous song |
| One tap on left, then on the right headphone | Skip to next song |

Figure 3:
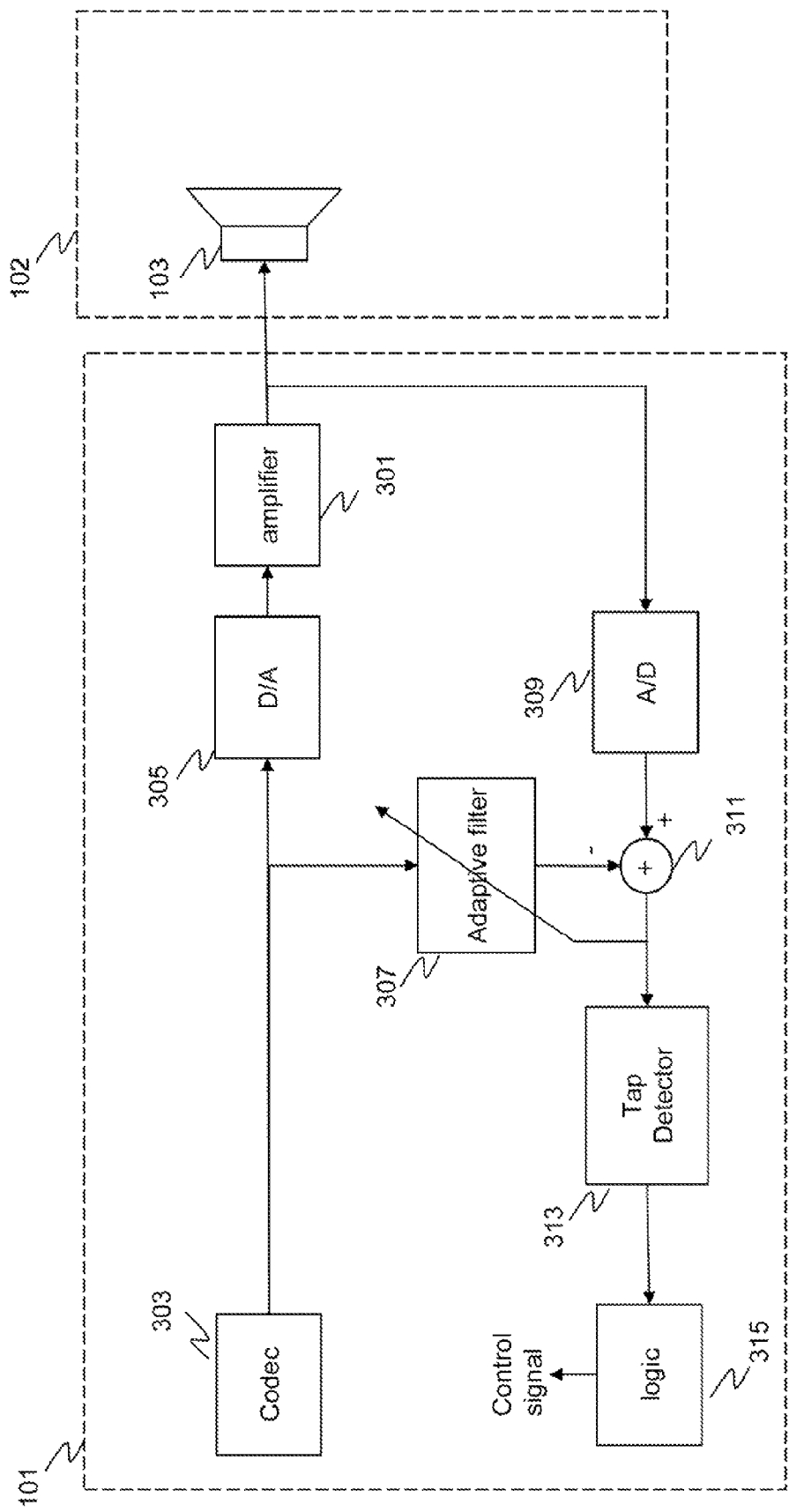
FIG. 3. is a block diagram of the headset and device of FIG. 1 in accordance with an alternate embodiment of the present invention.

FIG. 3 is a block diagram of the headset and device of FIG. 1 in accordance with an alternate embodiment of the present invention. This embodiment of the present invention is designed to allow device 101 to detect user taps on either earpiece 103, such that the taps serve as user inputs to control device 101. This embodiment relies on the fact that most transducers (i.e., speakers 103), including audio transducers, are capable of bi-directional energy transfer. Specifically, speakers 103 can be made to act as microphones. Because a physical tap transfers more energy then normal acoustical energy in the range of human hearing, even the poor microphone action of a stereo headset earpiece can be sufficient to provide a usable electrical signal in response to a tap. The challenge becomes that of recognizing the tap signal in the presence of the drive signal from the output of audio amplifier 309. In order to accomplish this task, advanced digital filtering is done in order to enhance the tap signal.

Because tap detection takes place within device 101, standard, buttonless, off-the-shelf headphones may be utilized to control device 101. Thus, simply by plugging in a standard set of headphones to device 101 can enable the ability to pause music, take a phone call, mute, hang-up, or call back, without ever directly accessing the mobile device, or by pressing any button on the headphones.

As shown, device 101 comprises amplifier 301, codec 303, digital-to-analog (D/A) converter 305, adaptive filter 307, analog-to-digital (A/D) converter 309, mixer 311, tap detector 313, and logic circuitry 315. Amplifier 301 comprises a standard output amplifier designed to output an analog signal (e.g., music) or a digital signal (e.g. PWM waveform from a Class D audio amplifier) to be transmitted to speaker 103. Codec 303 produces digital sample output from a file on the device file system during playback (such as music/video file) or represents the speech de-coder on the device's down-link. Codec 303 outputs a digital representation of the audio sent to the speaker/headset, which also servers as a reference signal for the adaptive filtering system. The digital signal output from codec 303 is converted to an analog signal by D/A converter 305 and output to headset 102 after amplification by the amplifier 301.

Figure 4:
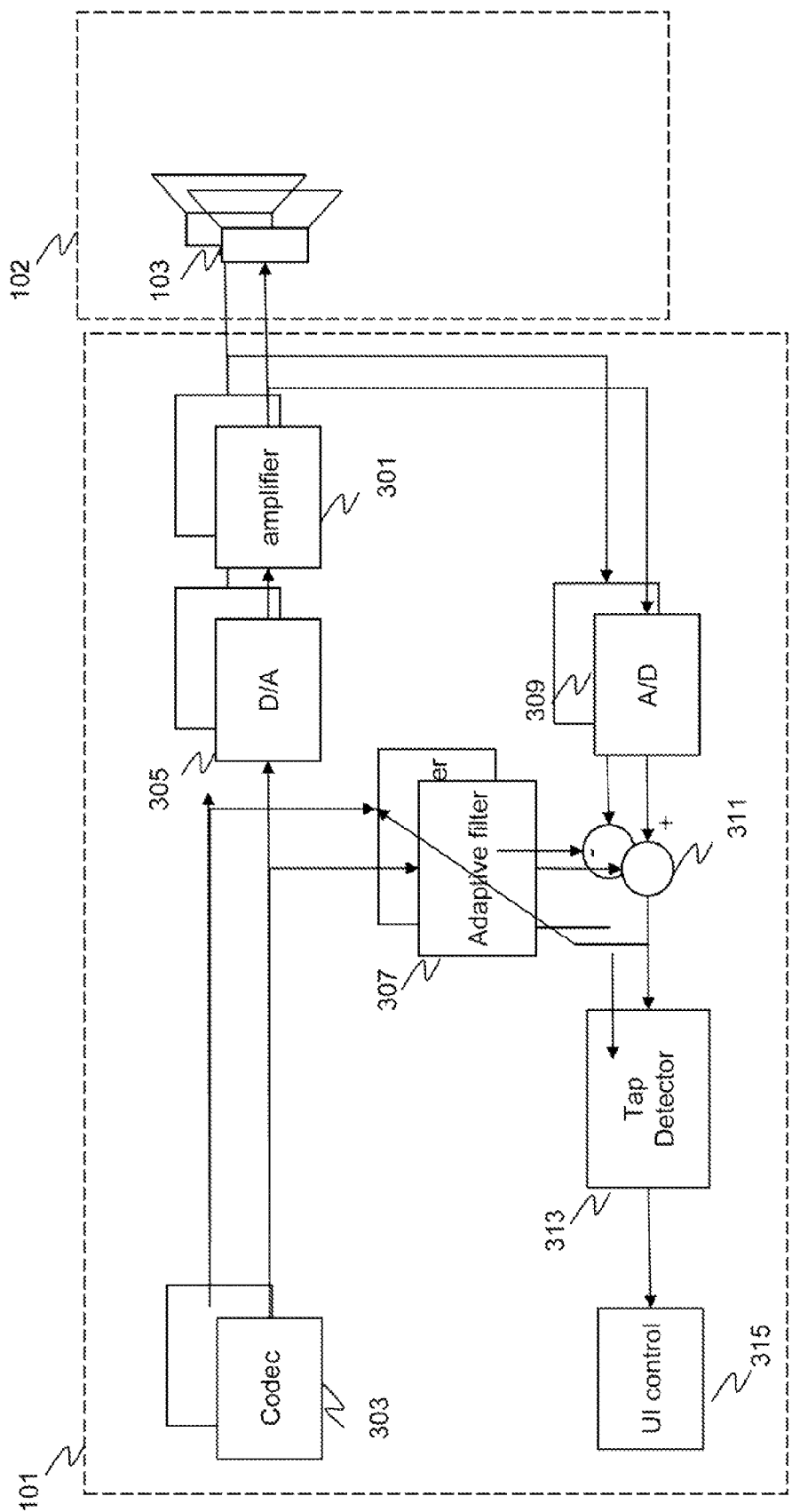
FIG. 4. is a block diagram of the headset and device of FIG. 1 in accordance with an alternate embodiment of the present invention.

It should be noted that for simplicity, FIG. 3 shows only a single speaker 103 being coupled to device 101. However, multiple speakers 103 may be coupled to device 101. When multiple speakers 103 are coupled to device 101, an additional amplifier 301, codec 303, converter 305, filter 307 converter 309, and mixer 311 are provided for each speaker. This is illustrated in FIG. 4 for two speakers 103.

As discussed above, a challenge is to recognize the tap signal originating from the headset transducer in the presence of the drive signal output from D/A converter 305. In order to accomplish this task, the signal sent to the speaker is again converted to a digital representation by A/D converter 309. This signal contains a modified form of the reference signal (dominant component), small amount of additive interference and noise as well as the useful signal produced by tapping on the transducer. The signal output from codec 303 (i.e. reference signal) is processed by an adaptive filter and is subtracted from the output from converter 309 (via mixer 311). The filter is adapted, such that an error signal (difference between filter output and signal observed out of D/A converter) is minimized, thus reducing the contribution of the reference signal and effectively increasing the contribution of the useful signal (that produced by tapping on the transducer). The resulting signal is then passed to tap detector 313, output of which is sent to logic circuitry 315, which translates the taps into an appropriate action and outputs a control signal to control device 101.

Filter 307 comprises an adaptation control system, designed to filter out the reference signal (music, or voice downlink sent to the speaker) out of the signal observed on the transducer. The adaptive system thus automatically takes into account differences caused by use of different headsets, various changes in electrical/acoustical coupling, impedance mismatches etc. The adaptive system can accomplish this task, because it has prior knowledge of the signal it is required to filter out (the reference signal) and can therefore produce output in which the useful signal (signal produced by tapping on the transducer) is dominant.

Figure 5:
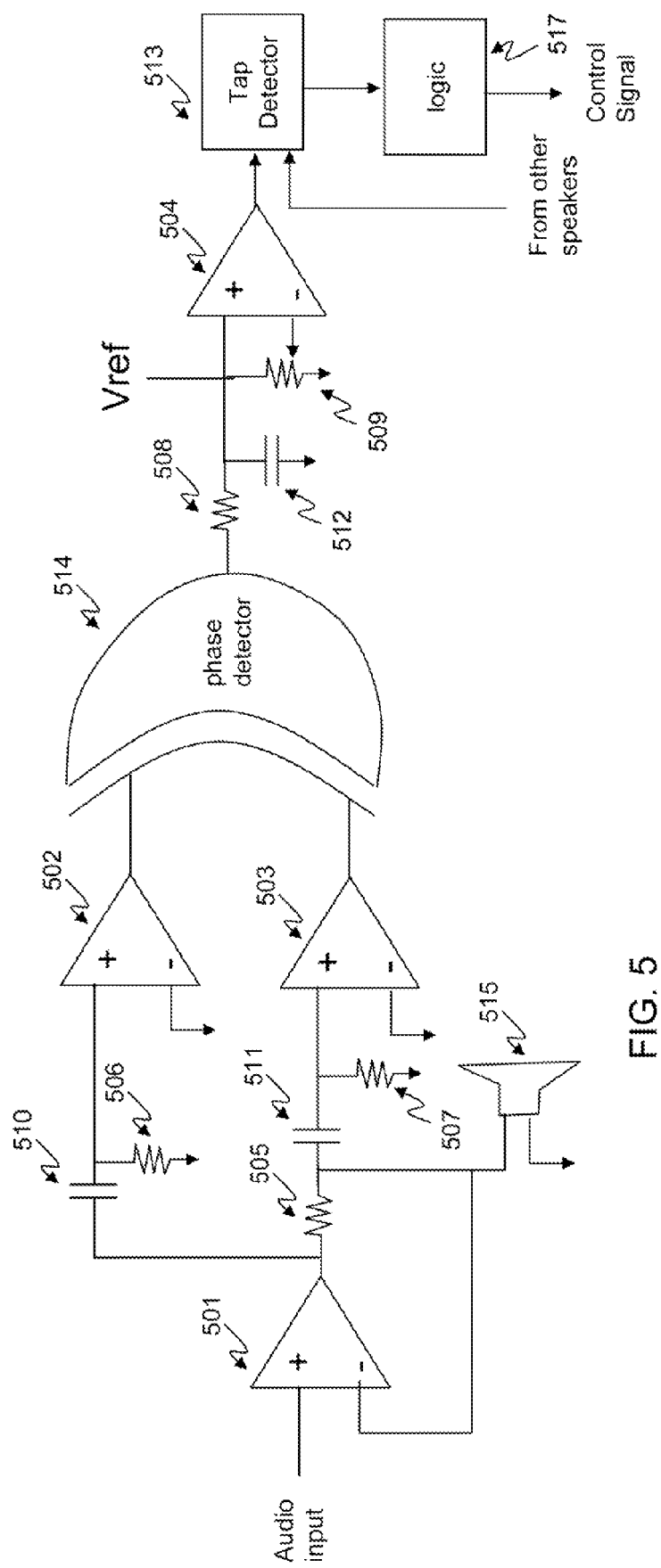
FIG. 5 is a block diagram of the headset and device of FIG. 1 in accordance with a second alternate embodiment of the present invention.

FIG. 5 is a block diagram of the headset and device of FIG. 1 in accordance with a second alternate embodiment of the present invention. As with FIG. 3, for simplicity only a single speaker is shown in FIG. 5. Device 101 in this particular embodiment utilizes a back electromotive force (emf) detector in order to detect any tap on headset 102. As shown, device 101 comprises amplifiers 501-504, resisters 505-509, capacitors 510-512, tap detector 513, phase detector 514, and speaker 515. The particular values for resisters and capacitors 505-512 are shown in table 2.

TABLE 2 values for various components of FIG. 5

| | |
|---|---|
| Hysteretic Comparator 502, 503, 504 | Maxim 961 |
| Op-Amp | TL082 |
| resistor 505 | 150 ohms |
| resistor 506 | 1 MEG ohms |
| resistor 507 | 1 MEG ohms |
| resistor 508 | 100K ohms |
| resistor 509 | 100k ohms |
| capacitor 510 | 0.1 micro farads |
| capacitor 511 | 0.1 micro farads |
| capacitor 512 | 1.0 micro farads |
| Tap Detector 513 | CPU, ASIC, . . . , etc. |
| XOR Gate 514 | MC4070 |
| Speaker 515 | 30 ohms electrodynamic |

During operation an audio signal enters amplifier 501 and is appropriately amplified. This audio signal could be from either the right or left audio channels that feed the headset. The amplifier is configured with a gain network formed by resistor 505 and speaker 515 to generate two different outputs.

One output feeds an amplified copy of the audio signal to ground-referenced comparator 502 through high-pass filter network 510-506. The other output feeds an exact copy of the voltage across speaker 515 to ground-referenced comparator 503. Because comparators 502 and 503 function as zero-crossing detectors, their outputs represent the phases of their respective inputs.

The outputs of comparators 502 and 503 feed the phase detector, comprised of XOR gate 514, resistor 508 and capacitor 512, such that the phase difference between the two signals from zero degrees to 360 degrees is represented by an analog voltage across capacitor 512 on a linear scale between zero volts and the supply voltage that feeds comparator 514. Resistor 508 and capacitor 512 also form a low-pass filter that introduces a delay in the response to a new phase relationship between the two signals.

Therefore, if the phase between the two signals feeding the phase detector starts from zero, then goes to some non-zero value, there will be a delay of five RC time constants before the voltage across capacitor 512 settles to its final value representing the phase difference. Potentiometer 509 and comparator 504 monitor the voltage on capacitor 512, and assert a control signal when that voltage reaches a specific value, indicating that the phase difference between the two signals has exceeded a particular threshold.

Under normal operation, with normal audio input signal amplitudes that do not result in distortion to the acoustical signal produced by the transducer, the two outputs fed to the phase comparator formed by comparator 514, resistor 508 and capacitor 512 will be in phase. The output across capacitor 512 will be zero.

When the user taps on the transducer, either in the case of an audio input signal or the absence of an audio input signal, the phase relationship between the two signals that feed the phase comparator formed by comparator 514, resistor 508 and capacitor 512 will not be in phase. The degree to which they are out of phase is a function of the physical magnitude of the tap applied to the transducer.

Therefore, when there are no taps, no output signal is applied to the tap detector 513. When a tap is present, an output pulse (or a burst of output pulses) will be applied to the tap detector 513. Tap detector 513 can condition a burst caused by a marginally weak tap to appear as a single detection signal. In this way, the circuitry of FIG. 5 enables the user to produce input signals to a mobile device through physical taps. Tap detector outputs a signal to logic circuitry 517 whenever a tap is detected. This signal comprises not only information that a tap was received, but additionally comprises information on what speaker was tapped. Logic circuitry 517 receives this information and translates this information into an appropriate control signal.

Figure 6:
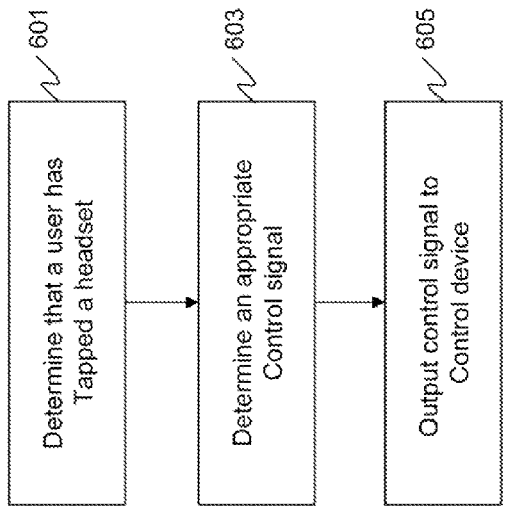
FIG. 6 is a flow chart showing the operation of the headset of FIG. 2.

FIG. 6 is a flow chart showing operation of the headset of FIG. 1. The logic flow begins at step 601 where a tap detector determines that a user has tapped upon a headset. Part of this determination may comprise filtering a signal in order to better receive the user's tap(s) on the headset, subtracting an output signal from a signal received from the headset, determining a phase difference between an output signal and the signal received from the headset, and determining an acceleration.

Additionally, as discussed above, the user's tap(s) upon the headset does not press any hardware or software keys located on the headset, but simply comprises a strike with a light blow or repeated, slight blows. Additionally, these taps may be received on the speaker of the headset that allows bi-directional energy transfer through the headset.

At step 603 logic circuitry determines an appropriate control signal based on the tap(s) received. This step preferably comprises determining how many taps were received, and/or determining where on the headset (e.g., left or right speaker) the tap was received.

Finally, at step 605, the logic circuitry outputs a control signal, controlling functionality of a device based on the reception of the tap upon the headset. The device may comprise a mobile telephone, a portable music player, a laptop computer, a notepad, . . . , etc. As discussed above, the functionality may be controlled based on how many taps were received, and/or where on the headset the taps were received. As described above the control signal may be a signal that instructs the device to mute a volume, increase the volume, decrease the volume, answer a phone call, hang up a phone call, or place a call to a particular number.

While the invention has been particularly shown and described with reference to a particular embodiment, it will be understood by those skilled in the art that various changes in form and details may be made therein without departing from the spirit and scope of the invention. It is intended that such changes come within the scope of the following claims:

The invention claimed is:

1. A method for controlling a device, the method comprising:
    sending, by the device via a wire to a headset distinct from the device, a reference signal;
    determining, by a tap detector on the device, from a modified form of the reference signal, that a tap signal is present in addition to the reference signal, the tap signal not resulting from a press of any hardware or software keys located on the headset;
    based, at least in part, on the determined tap signal, deciphering, by the device, the tap signal; and
    based, at least in part, on the deciphered tap signal, controlling, by the device, functionality of the device;

wherein the determining is based, at least in part, on comparing the sent reference signal to the modified form of the reference signal.

2. The method of claim 1 wherein controlling functionality comprises:
   determining how many taps were present in the tap signal; and
   controlling a function of the device based on how many taps were present.

3. The method of claim 1 wherein controlling functionality comprises:
   determining how many taps were present in the tap signal;
   determining whether a left or a right speaker was tapped; and
   controlling a function of the device based on how many taps were present and on whether the left or the right speaker was tapped.

4. The method of claim 1 wherein the device comprises a mobile telephone, a portable music player, a laptop computer, or a notepad.

5. The method of claim 1 wherein controlling comprises at least one of the following: muting or un-muting a volume, increasing the volume, decreasing the volume, answering a phone call, hanging up a phone call, and placing a call to a particular number.

6. A device comprising:
   an amplifier configured for sending, via a wire to a headset distinct from the device, a reference signal;
   a tap detector configured for determining, from a modified form of the reference signal, that a tap signal is present in addition to the reference signal, wherein the tap signal does not result from a press of any hardware or software keys located on the headset; and
   logic circuitry configured for deciphering, based at least in part of the determined tap signal, the tap signal and for controlling, based at least in part on the deciphering, functionality of the device;
   wherein the determining is based, at least in part, on comparing the sent reference signal to the modified form of the reference signal.

7. The device of claim 6 wherein the logic circuitry controls the functionality of the device by:
   determining how many taps were present in the tap signal; and
   controlling a function of the device based on how many taps were present.

8. The device of claim 6 wherein the logic circuitry controls the functionality of the device by:
   determining how many taps were present in the tap signal;
   determining whether a left or a right speaker was tapped; and
   controlling a function of the device based on how many taps were present and on whether the left or the right speaker was tapped.

9. The device of claim 6 wherein the device comprises a mobile telephone, a portable music player, a laptop computer, or a notepad.

10. The device of claim 6 wherein controlling comprises at least one of the following: muting or un-muting a volume, increasing the volume, decreasing the volume, answering a phone call, hanging up a phone call, and placing a call to a particular number.

* * * * *